United States Patent [19]

Tada et al.

[11] 4,308,155

[45] Dec. 29, 1981

[54] RUBBER OR PLASTIC MAGNET AND MAGNETIC POWDER FOR MAKING THE SAME

[75] Inventors: Takeo Tada, Urawa; Katsuji Honda, Yachiyo; Masami Oguriyama, Ichikawa, all of Japan

[73] Assignee: TDK Electronics Co., Ltd., Tokyo, Japan

[21] Appl. No.: 89,646

[22] Filed: Oct. 29, 1979

Related U.S. Application Data

[63] Continuation-in-part of Ser. No. 801,000, May 26, 1977, abandoned.

[30] Foreign Application Priority Data

Nov. 24, 1976 [JP] Japan ................................ 51-140177

[51] Int. Cl.$^3$ ......................... H01F 1/37; C04B 35/26; C09C 3/04

[52] U.S. Cl. ................................. 252/62.54; 106/304; 252/62.63

[58] Field of Search ............... 252/62.54, 62.63, 62.53, 252/66.54; 106/304

[56] References Cited

U.S. PATENT DOCUMENTS

| | | | |
|---|---|---|---|
| 2,837,483 | 6/1958 | Hakker et al. | 252/62.63 |
| 2,964,793 | 12/1960 | Blume | 252/62.54 X |
| 3,243,374 | 3/1966 | Gillard | 252/62.54 X |
| 3,246,060 | 4/1966 | Blume | 252/62.63 |
| 3,428,603 | 2/1969 | Kroenke | 252/62.54 |
| 3,764,539 | 10/1973 | Cochardt et al. | 252/62.54 |
| 3,846,323 | 11/1974 | Esper et al. | 252/62.63 |
| 3,884,823 | 5/1975 | Clendenen et al. | 252/62.63 |
| 4,022,701 | 5/1977 | Sawa et al. | 252/62.54 |

FOREIGN PATENT DOCUMENTS

| | | | |
|---|---|---|---|
| 1571622 | 1/1971 | Fed. Rep. of Germany . | |
| 1323095 | 2/1963 | France | 252/62.54 |
| 2089928 | 1/1972 | France . | |
| 46-24834 | 7/1971 | Japan . | |

OTHER PUBLICATIONS

Hackh's Chemical Dictionary by Grant 3rd Ed., p. 667, Blakiston, Philadelphia (1944).

*Primary Examiner*—F. Edmundson
*Attorney, Agent, or Firm*—Seidel, Gonda, Goldhammer & Panitch

[57] ABSTRACT

A rubber or plastic magnet of high magnetic properties is produced by incorporating a magnetoplumbite type magnetic powder into a rubber or thermoplastic or thermosetting matrix at a high concentration with a high degree of orientation of the magnetic particles. Such high concentration and orientation can be obtained by using a magnetoplumbite type magnetic powder having a compressed density in the range between 3.30 g/cm$^3$ and about 3.55 g/cm$^3$ and an average particle size of about 1.00 and 1.50$\mu$, said particles being prepared by dry crushing process from coarse sintered particles and having predominantly single crystal structure.

11 Claims, No Drawings

RUBBER OR PLASTIC MAGNET AND MAGNETIC POWDER FOR MAKING THE SAME

CROSS REFERENCE TO RELATED APPLICATION

This application is a continuation-in-part of our copending U.S. Patent application Ser. No. 801,000, filed May 26, 1977 now abandoned, entitled Rubber or Plastic Magnet and Magnetic Powder for Making the Same, which application is now abandoned.

BACKGROUND OF THE INVENTION

The present invention relates to a pulverized magnetic material capable of being incorporated into a non-magnetic matrix such as rubber or plastic material at a high concentration and being oriented to a high degree to form a rubber or plastic magnet of high energy product. The present invention is also directed to a rubber or plastic magnet produced from the pulverized magnetic material.

Heretofore, a rubber magnet or a plastic magnet has been widely used in many applications because of its desirable properties, especially good plasticity or resiliency, superior workability, etc. which are not the case in hard magnets such as sintered ferrite magnets, alloy magnets, etc. However, due to the fact that the rubber or plastic magnet was produced by blending a pulverized magnetic material with a rubber or plastic matrix, the magnetic properties of thusly produced rubber or plastic magnet were not necessarily satisfactory and accordingly its applications have been restricted. For example, it is necessary to employ a magnet of a much larger size than that of the conventional sintered magnet for the same application and thus the development of the rubber or plastic materials has been hindered.

The critical factors for improving magnetic properties of the rubber or plastic magnet are some physical properties of the magnetic powder to be incorporated in the rubber or plastic magnet in a quantity exceeding about 90% by weight. The properties of the magnetic powder must primarily meet the following two requirements with respect to the matrix.

(1) The magnetic powder can be filled in the rubber or plastic matrix as much as possible.

(2) The particles of the magnet powder can be easily oriented in the rubber or plastic matrix in one desired direction.

A typical example of the conventional magnetic powders which have been successfully utilized for producing a rubber or plastic magnet is of the magnetoplumbite type. However, the magnetic powder of this type has not fully satisfied these two requirements. Rather, these two requirements are not compatible with each other for the conventional magneto-plumbite powder. More specifically, those powders which are capable of being filled at a high concentration are not easily oriented, while those powders which are capable of being easily oriented in one direction are not easily filled.

It is known that as particle size decreases, the coercive force of a ferromagnetic powder increases and reaches a high value when the particle size becomes single-domain size (1μ or less). It is also known that single-domain size particles of about 1μ are not very well oriented in a strong magnetic field because the orientation effect decreases with the decrease of the particle size due to the decreased torque applied to such small particles. Magnetic properties of a ferromagnetic powder depend also on the crystalline structure of magnetic particles. Single-domain particles have a high coercive force as mentioned above but the magnetic orientation effect in a plastic or rubber matrix is lower for polycrystal particles than for single crystal particles. Multi-domain particles (larger than 1μ) exhibit various magnetic proparties depending on the crystalline structure. If such particles consist of single crystals, the coercive force is very low due to the free movements of the Block walls upon application of a magnetic field but the magnetic orientation effect is the greatest because of the fact that the magnetic domains in each particle develop in one direction so that the torque exerted on the magnetic particles by the magnetic orientation field becomes large. On the other hand, polycrystal particles having single-domain size crystallites have a high coercivity as the movement of the Block walls is blocked by the interfaces between the crystallites. However, such particles are not easily oriented under a strong magnetic field due to the random orientation of the crystallites. The only exception is the case where each polycrystal particle consists of single-domain crystallites which have been unidirectionally aligned (see U.S. Pat. No. 3,764,539).

As for the mechanical properties, particularly the filling ability of a magnetic powder and the workability of a plastic or rubber magnet, it is known that the larger the particle size, the higher are the mechanical strength and workability of a plastic or rubber magnet because of the better filling ability of the particles in the rubber or plastic matrix. Although single-domain particles have a high coercive force, they are not desirable from the mechanical criteria. The magnetic properties depend also on the filling ability which determines the remnance.

Roughly, a rubber or plastic magnet is conventionally produced according to two methods. One method is that a ferromagnetic powder, particularly of magnetoplumbite type such as barium ferrite, strontium ferrite or lead plumbite ferrite, having an average particle size over 1.5μ (multimagnetic domain size) and polycrystal structure is incorporated into a rubber or plastic matrix. The advantage is that the magnetic powder is easily filled in the matrix whereby a rubber or plastic magnet having a good mechanical strength and a good workability is easily obtained. However, such magnet has a drawback by the fact that the magnetic powder dispersed in the matrix cannot be oriented by magnetic orientation procedure, resulting in a low energy product (BHmax). Accordingly, it has been believed in the art that a superior flexible rubber or plastic magnet can only be obtained by blending a magnetic powder having single domain size, i.e. less than 1μ, usually 0.1–1.0μ with a rubber or plastic matrix and then subjecting the mixture to magnetic orientation procedure. The advantage of this second method is of course that the magnetic powder has a high coercive force and a relatively good (but not enough) orientation effect is obtained thereby to improve the remnant magnetic flux, but the drawback is that it is difficult to fill the magnetic powder in the matrix at a high concentration, resulting in a low remnant magnetic flux and the improvement in the energy product is not satisfactory.

One approach to overcome these disadvantages was proposed by U.S. Pat. No. 3,764,539 in which polycrystal magnetic particles, such as barium ferrite having uniform particle sizes of approximately 5μ are incorporated into an elastomeric binder without use of magnetic orientation. The magnetic particles in this case are those which have been so treated with certain additives that single-domain particles are first magnetically oriented in one direction and then bonded together by the additives to form a larger particle of about 5μ or more. Each polycrystal particle is characterized in that the anisotropic axis of the single-domain particles (crystallites) are fixed in one direction in each polycrystal particle and the crystallites are separated by the additive layers. As described hereinbefore, it is easy for such large magnetic particles to attain a high concentration in the elastomeric binder. The magnetic properties are satisfactory but it is necesssary to prepare the anisotropic polycrystal particles by a very complicated procedure. U.S. Pat. No. 4,022,701 proposed to overcome the difficulties in the prior art by adopting a special plastic binder system. More specifically, magnetic particles such as barium ferrite having a particle size of 1μ or less (single domain size) are blended with metal-cross-linked copolymers of α-olefin and α,β-unsaturated carboxylic acid, and then subjected to magnetic orientation. Thus, the approach of this patent relies on the properties of the copolymers. There is no disclosure of parameters which are to be satisfied by the particle sizes of the magnetic powder.

French Pat. No. 1,323,095 proposed to produce a flexible magnet wherein a magnetic powder such as barium ferrite having particle sizes of 0.5–10μ whose average particle size is between 1μ and 1.5μ is mixed with a plastic binder selected from special plastic materials which maintain fluidity even at a very high concentration of the magnetic powder. Accordingly, this patent again relies on the improved binder material. Magnetic or mechanical orientation is not used in the process of this patent. Also, there is no teaching on how the magnetic powder is produced.

As to the conventional methods of preparation of magnetic powders, sintered magnetoplumbite type magnetic material is ground or crushed with use of a ball mill or a vibration mill. Two procedures are presently employed, the dry method and the wet method. In order to obtain a magnetic powder having a particle size of less than 1μ, the wet method using water or other liquid medium must be used because the dry method cannot attain particle sizes of less than 2∼3μ after a long period of time. However, the particles thusly obtained by the wet method are very uniform and it is difficult to fill them into a rubber or plastic matrix.

A magnetoplumbite type magnet of high quality can be prepared by sintering a starting mixture composition of oxides of high purity at a high temperature above, for example, 1200° C. However, the sintered magnet is very hard and is difficult to pulverize into single-domain sizes. The dry method can only produce 2∼3μ particles as just mentioned due to the low crushing ability of the mills and the wet method must be relied on at least in the final pulverizing step. However, the wet method produces a magnetic powder having a very uniform particle size distribution which cannot meet the requirement (1) above. If a magnetic powder is produced by the dry method, the magnetic properties in a rubber or plastic magnet are poor due to the large particle sizes and the multi-domain structure. As a compromise, a rubber or plastic magnet can be prepared by sintering a starting mixture material at a lower temperature below, for example, 1200° C. and sometimes using additives for lowering the sintering temperature. With the method a magnetic powder of any particle size can be easily obtained since the sintered body is easily pulverized. However, the magnetic properties are poor owing to the unreacted portion and/or the impurities.

Accordingly, a primay object of the present invention is to provide a rubber or plastic magnet whose magnetic properties are substantially improved.

Another object of the present invention is to provide a rubber or plastic magnet which comprises a rubber or plastic matrix and a magnetoplumbite type magnet powder dispersed therein at a high concentration and with a high degree of orientation.

A further object of the present invention is to provide a magnetic powder which is adapted to produce a rubber or plastic magnet of high magnetic properties.

A still further object of the present invention is to provide a magnetic powder of magnetoplumbite type which is capable of being incorporated in a non-magnetic matrix such as rubber or plastic material not only at a high concentration but also with a high degree of orientation.

SUMMARY OF THE INVENTION

According to our study, it has been found that the filling capacity and the ease of orientation of the magnetoplumbite-type magnetic powder in a rubber or plastic matrix are closely associated with the average particle size, the compressed density and the degree of crystallization of the powder. The filling capacity of a magnetic powder is the measure of the maximum density of the magnetic particles in the finished rubber or plastic magnet attained without making the magnet brittle, and the ease of orientation is the measure of the magnetic properties in a desired direction for the same density of the magnetic particles. The reason why the average particle size, the compressed density and the degree of crystallization of the magnetic powder of magnetoplumbite type relate to these two requirements is not very clear but a number of basic experiments done by the inventors confirmed this fact.

Briefly, the present invention provides an improved magnetic powder for a rubber or plastic magnet, said magnetic powder consisting essentially of a magnetoplumbite-type magnetic material (particularly, barium ferrite powder) prepared by a dry method having an average particle size between 1.00μ and 1.50μ measured with the Fisher Sub-Sieve Sizer and having a compressed density between 3.30 g/cm$^3$ and 3.55 g/cm$^3$ when compacted under a pressure of 1 ton/cm$^2$. Also, the magnetic powder has predominantly single crystal structure. The Fisher Sub-Sieve Sizer is an instrument sold by Fisher Scientific Company, Forbes Aven. Pittsburgh, Pa., wherein air-permeability change in an air passage due to the presence of particles is measured to indicate the average particle size.

The present invention further provides a rubber or plastic magnet by incorporating the aforementioned magnetic powder into a non-magnetic rubber or plastic matrix.

The average particle size of 1.00–1.50μ is larger than the particle size which has been believed in the art to be essential for the superior magnetic orientation.

However, the present inventors have found that if a magnetic powder consists predominantly of single crystals, the compact density of 3.30–3.50 g/cm$^2$ is selected, and the magnetic powder having an average particle size over 1μ, i.e. 1.00–1.50μ is selected, such powder can not only be easily filled in the rubber or plastic matrix but also can be easily oriented in such matrix so as to give a superior remnant magnetic flux while keeping the intrinsic coersive force at a high level, thereby to give a large energy product. This phenomenon cannot be very well explained but might be attributed to the fact that most of the magnetic particles have single crystal structure and the magnetic domains in each particle are easily developed in one direction by magnetic orientation field to generate a large torque applied to each particle to thereby greatly improve the remnant magnetic flux while maintaining the coercive force at a relatively large value due to the relatively small particle sizes and that the particles having a wide particle size distribution as expressed by the compressed density can be easily filled in the rubber or plastic matrix to give a high remnant magnetic flux.

DETAILED EXPLANATION OF THE INVENTION

In order to incorporate or disperse a magnetic powder into a rubber or plastic matrix to a high degree, it is expected from the theoretical standpoint that the higher the pressure applied to the mixture of the rubber matrix and the magnetic powder in a blending machine and in a molding machine (e.g. injection molding machine, extrusion molding machines, calendering rolls and the like), the greater will be the quantity of the filled magnetic powder. However, from the practical standpoint, it is required that the magnetic powder attain a high compressed density at as low pressure as possible in order to attain a maximum filling quantity within the capacity of the blending machine or the molding machine used. Furthermore, the filling quantity of the magnetic powder in a rubber or plastic material depends not only on the processing operations such as manner of mixing, manner of molding, but also on the physical properties of the rubber or plastic material used. Thus, the filling quantity is not singly a measure of evaluation of the quality of a magnet.

Through an extensive effort made by the inventors in which the compressed density at a working pressure of 1 ton/cm$^2$ was taken up as a measure of evaluation within the capacity of the practical machines, it has been found that a magnetic powder predominantly consisting of single crystal particles, having an average particle size in the range of about 1.00–1.50$\mu$ and having a compressed density in the range of about 3.30–3.55 g/cm$^3$ satisfies the aforementioned two requirements.

The type of the magnetic powder used in the present invention is of the magnetoplumbite type, such as barium ferrite, plumbite and strontium ferrite, and particularly barium ferrite.

The magnetic powder of magnetoplumbite type of the present invention is produced by first firing a starting composition with no additive at such a high temperature as 1200° C. or higher. It is observed that the sintered magnetic material develops large grains (single crystal areas) having grain size over 2-3$\mu$. This is easily confirmed by an electron microscope or other means and is attributed to the purity of the starting composition and the high sintering temperature. Then, the sintered magnetic material mass is crushed to coarse particles and then charged into a vibration mill or a ball mill. The pulverization is effected according to the dry process in which a pulverization promoter material selected from monovalent alcohol having 3 or less carbon atoms selected from methanol, ethanol, propanol, isopropanol, mixtures thereof and ethanol denatured with methanol is added in an amount of about 0.1% to 10% by weight to the coarse particles based on the weight of the magnetic particles. The resulting magnetic fine powder consists predominantly of single crystal particles due to the fact that the sintered magnetic material has grain sizes over 2~3$\mu$ before it is pulverized.

Whether or not the pulverized magnetic powder consists predominantly of single crystal particles is determined by the following method. An amount of the magnetic powder is first formed into an aggregate while applying a strong magnetic field to align the ferrite particles in one direction and to fix them in the aligned state. Then the remnant magnetic flux Br is measured in the direction of the alignment of the particles. Also, an equal amount of the same magnetic powder is formed into an aggregate without use of any magnetic field and then the remnant magnetic flux $Br_o$ is measured. Then, the powder having a ratio $Br/Br_o$ over 1.2 is defined to be a powder consisting predominantly of single crystal particles.

Assuming that the magnetic powder consists of perfect polycrystal particles, the ratio $Br/Br_o$ will be 1 because the polycrystal particles contain randomly oriented small crystallites confined by crystal boundaries and will not be rotated by a magnetic field. On the other hand, if the powder consists of perfect single crystal particles, the single-domains will be easily developed under the influence of the magnetic field to generate a large torque to rotate the particles to the direction of the magnetic field. It should be noted that the magnetic powder disclosed in the above-cited U.S. Pat. No. 3,764,539 consists of polycrystal particles, though it used the term "predominantly of single crystal characteristics", in light of the fact that single crystals in each particle are fixed in an aligned condition by an additive which forms boundaries of the single crystals. In this sense, the powder of the present invention is different from that in said patent.

The use of the specific pulverization promoter in the dry method is an important factor for the obtainment of the magnetic powder of the present invention though the pulverization method itself is not the subject matter of the present invention. The average particle size and the compressed density of the magnetic powder are proper for the present invention. The conventional wet method as described hereinbefore is not able to produce a magnetic powder having the specific range of these parameters. Also, although the conventional wet method may produce magnetic powder having an average particle size between 1.00$\mu$ and 1.50$\mu$ it can only give a compressed density below 3.30 g/cm$^3$. This might be attributed to the uniform particle sizes as confirmed by the inventors by electron microscope observation. On the other hand, the conventional dry method cannot give a magnetic powder of an average particle size between 1.00$\mu$ and 1.50$\mu$ if a high purity starting composition is fired at a high temperature above 1200° C. Further, commercially available powders, so long as the inventors know, do not have the specific parameters defined in the present invention.

The rubbers and plastic materials are selected from various known materials. The rubber may include natural rubber, synthetic natural rubber, styrene rubber, stereostyrene rubber, butadiene rubber, chloroprene rubber; butyl rubber, nitrile rubber, ethylene-propylene rubber, Hyperlon, acryl rubber, urethane rubber, silicone rubber, fluororubber, Thiocol, epichlorohydrine rubber, chlorinated polyethylene rubber, ethylene-vinyl acetate rubber and a mixture of two or three of them.

The plastic material is selected from thermoplastic or thermo-setting materials. Thermoplastic material may include polyethylene, polypropylene, polyvinylchloride, polyvinylacetate, nylon, ABS, polycarbonate, polystyrene, methacryl resin, polyacetal, polyamide resin, thermoplastic polyurethane, EVA resin, polysulfone, polyphenylene oxide, fluoroplastics, acrylonitrile-styrene resin (AS resin), ionomer resin and vinylchloride-vinylacetate copolymer. Thermosetting plastic material may include phenol resin, urea resin, xylene resin, melamine resin, polyester resin, diallylphthalate resin, epoxy resin and polyurethane resin.

The following advantages are obtained by using magnetic powders of the present invention.

(1) The magnetic particles can be easily filled or incorporated into a rubber or plastic matrix to a high degree at relatively low pressures within the capacity of the conventional treating machines and the orientation of the magnetic powder in one direction is easily attained by using conventional magnetic field generating means, so that rubber or plastic magnet produced from the magnetic powder has an energy product higher by about 30–80% than the energy product of the isotropic sintered ferrite magnet.

(2) Molding operations can be performed under a relatively low pressure. This makes possible the utilization of an extrusion molding machine provided with an open end nozzle which inherently has low molding pressure. Thus, a rubber magnet of superior properties is obtained which was not possible in the conventional rubber or plastic magnet.

(3) Mass production of rubber and plastic magnets having an energy product between about 1.4 and about 2.0 MG.Oe. becomes possible, whereby the rubber or plastic magnet can be used, for example, in producing a magneto-generator or a micromotor. Thus, the application of the rubber and plastic magnets is expanded from the conventional restricted applications typically seen in gaskets for refrigerator doors to a wide variety of fields of application.

The average particle size of the magnetic powder should not exceed about 1.50μ because the intrinsic coercive force of the particles tends to be suppressed above this upper limit. On the other hand, powders having an average particle size less than 1.00μ have a low compressed density and accordingly a low filling capacity. As to the compressed density, a high filling capacity cannot be obtained at a compressed density of less than 3.30 g/cm$^3$, with a result that the magnetic properties of the resulting rubber magnet are not satisfactory. On the other hand, it is practically impossible to obtain a compressed density of more than 3.55 g/cm$^3$ though a higher value is desirable.

The present invention will be illustrated in the following preferred working examples.

EXAMPLE 1

A mixture of barium carbonate ($BaCO_3$) and iron oxide (hematite-$Fe_2O_3$) having a ratio of 1 mole ($BaCO_3$) to 5.6 mole ($Fe_2O_3$) was placed in an attrition mill. No additive was added. One part by weight of water was added to one part by weight of the mixture and sufficiently mixed to form a slurry. The slurry was then dried in a dryer at a temperature of 110° C. and the dried slurry or cake was placed in an electric furnace in which the temperature of the cake was raised at a rate of 300° C. per hour and maintained at 1,350° for 2 hours. The fired product was subjected to a coarse crushing treatment to obtain particles having a particle size of about 0.5 mm. Then, the coarse particles were charged into a vibration mill together with steel balls each having a diameter of about 12 mm. The weight ratio of the coarse particles to the steel balls was 1 to 10. Also, 1 part by weight of ethyl alcohol was added based on 100 parts by weight of the coarse particles. The milling was done for about 6 hours.

The resulting finely divided particles were throughly dispersed by an impact pulverizer and then placed in an electric furnace in which the temperature of the fine particles was raised at a rate of 300° C. per hour and then maintained at 1,000° C. for 3 hours. This annealing step was to remove the strain in the magnetic particles and to improve the magnetic properties.

The average particle size of the produced magnetic powder was measured by Fisher Sub-Sieve Sizer Model 95. The value was 1.02μ. The compressed density of this powder was 3.36 g/cm$^3$ when 15 g of this magnetic powder was compacted at 1 ton/cm$^2$ in a mold into a compressed body having a diameter of 25 mm.

In order to determine the crystalline state, the powder was compacted in a mold under 1 ton/cm$^2$ into discs of a diameter of 25 mm and a thickness of 10 mm with and without a strong magnetic field of 6000 Oe. in the direction of the thickness of the discs. The remnant magnetic flux was measured in the direction of the thickness of the disks. The ratio $Br/Br_o$ was greater than 1.2 and accordingly the powder consisted dominantly of single domain particles.

148 g of ethylene-vinyl acetate copolymer, 12 g of stearic acid and 1840 g of the above magnetic powder were mixed and kneaded with use of two rolls at 120° C. and thereafter cooled to room temperature and ground into granules of about 3 mm for use as a molding material.

Next, the granular molding material was charged into a molding die and molded into a disc body of 25 mm diameter × 10 mm thickness under a pressure of 1 ton/cm$^2$ while heating at 180° C. Simultaneously with the pressure application, a DC magnetic field of a strength of 6,000 Oe. was applied from an electromagnet to the disc body in the direction of thickness for one minute. The molded body was cooled to room temperature and removed from the die. The properties of the magnet measured in the thickness direction are shown in Table 1.

As a comparative example, a magnetic powder which is commercially available for plastic and rubber magnets and has a compressed density of 3.10 g/cm$^3$ and an average particle size of 1.04μ was processed using the same plastic material, the same ratio and the same process. However, it was impossible to obtain a united body of the plastic material and the magnetic powder. Thus, this powder was not very much filled in ethylene vinyl acetate resin.

Also as a comparative example, a commercially available magnetic powder having a compressed density of 3.49 g/cm$^3$ and an average particle size of 1.80μ was similarly processed. This powder was easily filled into the plastic matrix but the orientation of the particles in a magnetic field was little observed.

TABLE 1

| Magnetic powder | Average particle size | compressed density g/cm$^3$ | workability | Br(G) | $B^{H}C$(oe) | $I^{H}C$(oe) | (B.H.)max (M.G.oe) |
|---|---|---|---|---|---|---|---|
| Example 1 | 1.02μ | 3.36 | good | 2780 | 2330 | 2920 | 1.92 |
| Commercially available magnetic powder (A) | 1.04 | 3.10 | not workable | — | — | — | — |
| Commercially available magnetic powder (B) | 1.80 | 3.49 | good | 1800 | 1620 | 3300 | 0.75 |

EXAMPLE 2

A mixture of 1 mole of barium carbonate ($BaCO_3$) and 6.0 moles of iron oxide ($Fe_2O_3$) was placed in an Attriter Mixer. Water was added in the same ratio as in Example 1 and the slurry was treated in the same manner as in Example 1. The dried slurry or cake was fired for three hours at about 1250° C. Then, the fired body was subjected to a coarse crushing treatment and then treated in a vibration mill for about five hours in a manner similar to Example 1. Further, after treatment in a pulverizer the fine magnetic particles were heated at about 1080° C. for about one hour for annealing.

The resulting magnetic powder had a compressed density of 3.49 g/cm$^3$ and an average particle size of 1.32μ and consisted predominantly of single crystal particles.

7700 g of the magnetic powder thusly prepared was charged into a pressure kneader together with 628 g of nitrile rubber and 38 g of stearic acid and kneaded for about 25 minutes. The kneaded material was ground into granules of about 5 mm for use as a molding material.

The granular molding material was extruded from a rubber extruder to form a rubber magnet in the form of a plate having a cross section of 20×8 mm. The diameter of the cylinder of the extruder was 50 mm. At the same time, a magnetic field of a strength of about 5000 oe. was constantly applied to the rubber magnet at the molding die of the extruder in the direction of the thickness of 8 mm of the rubber magnet, so that the magnetic particles in the rubber matrix were oriented in this direction.

The properties of the rubber magnet are shown in Table 2.

As comparative examples, commercially available magnetic powders (C and D) were similarly treated. However, it was found that the magnetic powder C was not very well filled into the rubber matrix and extrusion was not possible. The magnetic powder D was very well filled in the rubber matrix and workability was comparable to the magnetic powder according to the present example. However, the magnetic properties were only comparable to the conventional rubber magnet.

TABLE 2

| Magnetic powder | Average particle size | compressed density | workability | Br(G) | $B^{H}C$(oe) | $I^{H}C$(oe) | (B.H.)max (M.G.oe) |
|---|---|---|---|---|---|---|---|
| Example 2 | 1.32 | 3.49 | good | 2400 | 2150 | 2880 | 1.4 |
| Commercially available magnetic powder C | 1.42 | 3.26 | not extrudable | — | — | — | — |
| Commercially available magnetic powder D | 2.90 | 3.51 | good | 1880 | 1650 | 3400 | 0.8 |

EXAMPLE 3

The following composition was prepared.

| | |
|---|---|
| ferrite powder produced in accordance with Example 2 | 8,200 g |
| phenol novolak resin (formalin/phenol molar ratio = 0.9, specific gravity = 1.2 g/cm$^3$) | 630 |
| hexane | 79 |
| magnesium stearate | 13 |

30 kg of the mixture was blended in a kneader for 30 minutes and then kneaded with hot two rolls heated to 90° C. at 20 rpm for about 3 minutes to produce a 3 mm thick sheet. Then, it was crushed with a coarse crusher and thereafter pulverized in a pulverizer. The resulting pulverized material was used as a molding material.

The molding material was placed in a mold (molding cavity-25 mm in diameter, 10 mm in thickness) and subjected to a molding operation for about 10 minutes at a temperature of 150° C. and under a pressure of 200 kg/cm$^2$. During this molding operation, a DC magnetic field of about 6,000 oe. was applied in the direction of the thickness of the disc.

The magnetic properties were as listed in Table 3.

The commercially available powders A and B used in Example 1 were used in place of the ferrite powder of the present invention for the comparison purpose. However, the powder A could not be very well incorporated into the phenol resin matrix. Moreover, molding was not possible due to the fact that the powder was not bonded together. The powder B exhibited a good mixing with the phenol matrix and the workability (molding property) was good. However, it was difficult to orient the particles in one direction under influence of a magnetic field. Also, the magnetic properties were inferior.

TABLE 3

| Magnetic powder | Average particle size (μ) | Compressed Density (g/cm³) | Workability | Br(G) | $B^{H}C$(oe) | $I^{H}C$(oe) | (B.H.) max (MG.oe.) |
|---|---|---|---|---|---|---|---|
| Example 4 | 1.32 | 3.49 | good | 2540 | 2270 | 2880 | 1.55 |
| Commercially available powder (A) | 1.04 | 3.10 | bad | — | — | — | — |
| Commercially available powder (B) | 1.80 | 3.40 | good | 1790 | 1600 | 3300 | 0.73 |

EXAMPLE 4

(Dry method)

Magnetic fine powders were produced according to Example 1 except that the molar ratio of barium carbonate to iron oxide was changed to 5.8 and that the milling time was varied to obtain powders having various average particle sizes.

The compressed density, the average particle size, the ratio of $Br/Br_o$ and $I^{H}C$ were measured in accordance with the procedures as described in Example 1.

(Wet method)

For the comparison purpose, magnetic powders were prepared according to the present example except that the milling was done in a vibration mill using the wet method. Instead of ethyl alcohol, 100 parts by weight of water were added based on 100 parts by weight of the coarse, particles and the weight ratio of the coarse particles to the steel balls (having a diameter of 0.25 mm in this case) was 1 to 10. The compressed density, the average particle size, $Br/Br_o$ and $I^{H}C$ were also measured.

The results are shown in Table 4.

TABLE 4

| | Average Particle size (μ) | $I^{H}C$ (Oe) | Compressed density (g/cm³) | $Br/Br_o$ |
|---|---|---|---|---|
| Dry method | 0.8 | 2910 | 3.10 | 1.25 |
| | 0.9 | 3020 | 3.14 | 1.27 |
| | 1.0 | 2990 | 3.30 | 1.28 |
| | 1.1 | 2840 | 3.38 | 1.32 |
| | 1.2 | 2750 | 3.40 | 1.33 |
| | 1.3 | 2690 | 3.45 | 1.36 |
| | 1.4 | 2510 | 3.47 | 1.37 |
| | 1.5 | 2450 | 3.48 | 1.42 |
| | 1.6 | 2330 | 3.49 | 1.45 |
| | 1.8 | 2160 | 3.53 | 1.46 |
| | 2.0 | 1850 | 3.59 | 1.47 |
| Wet method | 0.8 | 3010 | 2.94 | 1.20 |
| | 0.9 | 3100 | 2.98 | 1.21 |
| | 1.0 | 3080 | 3.04 | 1.23 |
| | 1.1 | 2940 | 3.10 | 1.26 |
| | 1.2 | 2860 | 3.14 | 1.29 |
| | 1.3 | 2780 | 3.19 | 1.29 |
| | 1.4 | 2610 | 3.22 | 1.31 |
| | 1.5 | 2500 | 3.25 | 1.35 |
| | 1.6 | 2430 | 3.27 | 1.38 |
| | 1.8 | 2260 | 3.30 | 1.40 |
| | 2.0 | 1910 | 3.35 | 1.41 |

As seen from Table 4, the compressed density of the powders produced according to the dry method is higher than that of the powders produced according to the wet method for the same average particle size. Also, the ratio $Br/Br_o$ of the dry method powder is higher than that of the wet method powder for the same average particle size. Consequently, the data indicate the possibilities that the dry method powder will be filled into a plastic or rubber matrix in a quantity higher than the wet method powder and that the magnetic properties of the dry method powder will be improved by magnetic orientation procedure in a greater degree than the wet method powder. Further, the data show that the larger the average particle the greater will be the effect of magnetic orientation. The table also shows that all of the powders in the table consists predominantly of single crystal particles ($Br/Br_o$ 1.2).

Next, these powders were incorporated into a binder, which has the same composition as the binder used in Example 1, in the same manner as in Example 1. The granular molding material was formed into a disc body while applying a magnetic field of 6,000 oe. in a manner similar to Example 1. The magnetic properties are listed in Table 5. The powders indicated as having bad workability were not able to provide a united molded body due to its brittleness.

TABLE 5

| | Average particle size (μ) | Workability | Br (G) | $B^{H}C$ (oe) | $I^{H}C$(oe) | (B.H.) max (M.G.oe) |
|---|---|---|---|---|---|---|
| Dry method | 0.9 | bad | — | — | — | — |
| | 1.0 | good | 2710 | 2400 | 2950 | 1.84 |
| | 1.1 | good | 2710 | 2310 | 2800 | 1.84 |
| | 1.3 | good | 2740 | 2250 | 2630 | 1.86 |
| | 1.4 | good | 2770 | 2220 | 2580 | 1.90 |
| | 1.5 | good | 2790 | 2100 | 2410 | 1.94 |
| | 1.6 | good | 2810 | 2010 | 2290 | 1.98 |
| Wet method | 0.9 | bad | — | — | — | — |
| | 1.0 | bad | — | — | — | — |
| | 1.1 | bad | — | — | — | — |
| | 1.3 | bad | — | — | — | — |
| | 1.4 | bad | — | — | — | — |
| | 1.5 | not very good | 2410 | 2000 | 2460 | 1.45 |
| | 1.6 | not very good | 2480 | 2020 | 2370 | 1.55 |

Examining Table 5 together with Table 4, it is seen that the dry method powders provide superior plastic magnets if they have average particle sizes between 1.0 and 1.5μ and compressed densities between 3.30 and 3.55. More specifically, it is observed that the dry method powders exibit a good workability if they are larger than 1.0μ in average and a greater amount of magnetic powders is filled in the plastic magnet and the effect of magnetic orientation is also greater looking from the high values of Br and (B.H.) max. On the other hand $B^{H}C$ and $I^{H}C$ are are not very high for the powders having an average particle size over 1.5μ. Comparing the dry method powders with the wet method powders in Table 5, it is observed that the workability becomes better with the increase of the average particle size but the compressed density is also a decisive factor for the good workability. The wet method powders having average particle sizes over 1.5μ are workable but the magnetic properties are poor as they have low coercive forces and low remnant magnetic fluxes.

EXAMPLE 5

The effects of single crystal particles and polycrystal particles on the magnetic properties were studied by this example.

8 kg of iron oxide ($Fe_2O_3$), 1.8 kg of barium carbonate ($BaCO_3$) and 0.2 kg of lead monosilicate ($PbO.SiO_2$) were mixed with added water in a steel ball mill for 10 hrs. The resulting slurry was dried and the dried cake was calcined at 1060° C. for 15 min. The calcined clinker was subjected to coarse crushing treatment. Then, the coarse particles were placed in a vibration mill together with steel balls having a diameter of 12 mm, the weight ratio of the coarse particles to the steel balls being 1 to 10. The milling time was varied in order to obtain magnetic powders of various average particle sizes. The resulting fine powder was dispersed by use of an impact pulverizer and then annealed at 930° C. for 2 hours.

The compressed density, the ratio $Br/Br_o$ and $I^{H}C$ were measured in a manner similar to the measurements in Example 1. The results are listed in Table 6.

TABLE 6

| Average particle size (μ) | $I^{H}C$ (oe) | Compressed density (g/cm³) | Br/Bro |
|---|---|---|---|
| 0.8 | 2810 | 3.05 | 1.23 |
| 0.9 | 2890 | 3.09 | 1.19 |
| 1.0 | 2940 | 3.27 | 1.09 |
| 1.1 | 2930 | 3.30 | 1.01 |
| 1.2 | 2940 | 3.35 | 1.02 |
| 1.3 | 2940 | 3.39 | 1.00 |
| 1.4 | 2950 | 3.41 | 1.02 |
| 1.5 | 2950 | 3.46 | 1.01 |
| 1.6 | 2970 | 3.50 | 1.01 |

The values $Br/Br_o$ and $I^{H}C$ in this table clearly show that the powders consist of polycrystal particles which are attributed to the additive (lead monosilicate) and the low sintering temperature. One proof of their polycrystal nature is the value $Br/Br_o$ close to 1 as discussed hereinbefore. Another proof is substantially the same coercive force which, if they were single crystal particles, would vary with the varying particle sizes. Thus, the polycrystal magnetic powder will not be oriented by magnetic orientation procedure in a plastic or rubber matrix.

From the foregoing, it is concluded that polycrystal particles are not expected to provide a plastic or rubber magnet of superior magnetic properties even though such particles may have a compressed density and average particle sizes within the definition of the present invention. Incidentally, the fact that the sintered magnetic materials in this example were easily pulverized without any pulverizing promoter is because they contained an additive and were fired at a lower temperature so that soft and polycrystal phases were developed.

Accordingly, the comparison of this result with the result in Example 4 leads to a conclusion that those magnetic powders consisting predominantly of hard single crystal particles can give plastic or rubber magnets of higher quality than that of soft and polycrystal powders.

EXAMPLE 6

Magnetic powders were prepared according to the dry method in Example 4 except that the sintering temperature was varied and the coarse particles were milled until an average particle size of 1.4μ was obtained. The compressed density was measured and the results are listed in Table 7.

TABLE 7

| Sintering temp. (°C.) | Compressed density (g/cm³) |
|---|---|
| 1050 | 2.75 |
| 1100 | 3.10 |
| 1150 | 3.32 |
| 1200 | 3.35 |
| 1250 | 3.40 |
| 1300 | 3.46 |
| 1350 | 3.49 |

From this table, it is observed that the sintering temperature should be higher than 1200° C. in order to give a compressed density greater than 3.3 g/cm³ to cover those particles having an average particle size down to 1.0μ (see also Table 4).

What we claim is:

1. A process of producing a magnetic powder for use in a plastic or rubber magnet wherein said powder is filled in a plastic or rubber matrix and magnetically oriented comprising:

(a) firing a starting composition capable of forming when fired a ferrite selected from the group consisting of barium ferrite, strontium ferrite and lead plumbite ferrite at a temperature above 1200° C. to produce a sintered body of magnetic material;

(b) coarse-crushing said sintered body to obtain coarse particles;

(c) pulverizing said coarse particles together with about 0.1% by weight of about 10% by weight based on the weight of said coarse particles of a lower alcohol having three or less carbon atoms until a fine powder is obtained, said fine powder having an average particle size in the range between about 1.00μ and about 1.50μ measured with a Fisher Sub-Sieve Sizer and having a compressed density in the range of about 3.30 g/cm³ and about 3.55 g/cm³ when compressed under a pressure of 1 ton/cm²; and (d) annealing said fine powder at an elevated temperature.

2. A process according to claim 1 wherein said ferrite is barium ferrite.

3. A process according to claim 1 wherein said coarse particles are pulverized in a ball mill.

4. A process according to claim 1 wherein said coarse particles are pulverized in a vibration mill.

5. A process according to claim 1 wherein said alcohol is selected from the group consisting of methanol, ethanol, propanol, ispropanol, mixtures thereof, and ethanol denatured with methanol.

6. A magnetic powder for use in a plastic or rubber magnet wherein said powder is filled in a plastic or rubber matrix and magnetically oriented, said powder being made according to the following steps:

(a) firing a starting composition capable of forming when fired a ferrite selected from the group consisting of barium ferrite, strontium ferrite and lead plumbite ferrite at a temperature above 1200° C. to produce a sintered body of magnetic material;

(b) coarse-crushing said sintered body to obtain coarse particles;

(c) pulverizing said coarse particles together with about 0.1% by weight to about 10% by weight based on the weight of said coarse particles of a lower alcohol having three or less carbon atoms until a fine powder is obtained, said fine powder having an average particle size in the range between 1.00μ and 1.50μ measured with a Fisher Sub-Sieve Sizer having a compressed density in the range of about 3.30 g/cm$^3$ and about 3.55 g/cm$^3$ when compressed under a pressure of 1 ton/cm$^2$; and (d) annealing said fine powder at an elevated temperature.

7. A magnetic powder according to claim 6 wherein said ferrite is barium ferrite.

8. A magnetic powder according to claim 6 wherein said powder is comprised predominantly of single crystal particles.

9. A plastic or rubber magnet comprising a magnetic powder uniformly dispersed in a plastic or rubber matrix, said powder being magnetically or mechanically oriented in said matrix, said powder being made according to the following steps:

(a) firing a starting composition capable of forming when fired a ferrite selected from the group consisting of barium ferrite, strontium ferrite and lead plumbite ferrite at a temperature above 1200° C. to produce a sintered body of magnetic material;

(b) coarse-crushing said sintered body to obtain coarse particles;

(c) pulverizing said coarse particles together with about 0.1% by weight to about 10% by weight based on the weight of said coarse particles of a lower alcohol having three or less carbon atoms until a fine powder is obtained, said fine powder having an average particle size in the range between about 1.00μ and about 1.50μ measured with a Fisher Sub-Sieve Sizer and having a compressed density in the range of about 3.30 g/cm$^3$ and about 3.55 g/cm$^3$ when compressed under a pressure of 1 ton/cm$^2$; and (d) annealing said fine powder at an elevated temperature.

10. A magnet according to claim 9 wherein said ferrite is barium ferrite.

11. A magnet according to claim 9 wherein said plastic matrix is selected from the group consisting of thermoplastic materials and thermosetting materials.

* * * * *